US008861974B2

(12) United States Patent  (10) Patent No.: US 8,861,974 B2
Yamasaki  (45) Date of Patent: Oct. 14, 2014

(54) OPTICAL SIGNAL TRANSMITTING APPARATUS

(71) Applicant: Panasonic Corporation, Osaka (JP)

(72) Inventor: Sigeaki Yamasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 120 days.

(21) Appl. No.: 13/649,512

(22) Filed: Oct. 11, 2012

(65) Prior Publication Data

US 2013/0094850 A1    Apr. 18, 2013

(30) Foreign Application Priority Data

Oct. 12, 2011  (JP) .................................. 2011-224940

(51) Int. Cl.
| | |
|---|---|
| *H04B 10/00* | (2013.01) |
| *H04B 10/04* | (2006.01) |
| *H04B 10/12* | (2006.01) |
| *H04B 10/116* | (2013.01) |
| *H04L 1/00* | (2006.01) |
| *H04J 3/00* | (2006.01) |

(52) U.S. Cl.
CPC ............ *H04B 10/116* (2013.01); *H04L 1/0007* (2013.01); *H04J 3/00* (2013.01)
USPC .......................................... 398/154; 398/182

(58) Field of Classification Search
CPC ............. H04B 10/516; H04B 17/0075; H04L 7/0075; H04L 1/0007
USPC ......................................... 398/118–131, 172
See application file for complete search history.

(56) References Cited

U.S. PATENT DOCUMENTS

| | | | |
|---|---|---|---|
| 6,445,719 B1 | 9/2002 | Schneider et al. | |
| 6,778,586 B1 * | 8/2004 | Mano ............................ | 375/130 |
| 2005/0005225 A1 * | 1/2005 | Johnson et al. ............... | 714/758 |
| 2007/0092264 A1 | 4/2007 | Suzuki et al. | |
| 2007/0242676 A1 | 10/2007 | Fridman | |
| 2008/0279561 A1 * | 11/2008 | Sakai et al. ................... | 398/130 |

FOREIGN PATENT DOCUMENTS

| | | |
|---|---|---|
| JP | 4325604 | 9/2009 |
| WO | 01/17144 | 3/2001 |

OTHER PUBLICATIONS

Search report from E.P.O., mail date is Feb. 19, 2013.

* cited by examiner

*Primary Examiner* — David Payne
*Assistant Examiner* — Casey Kretzer
(74) *Attorney, Agent, or Firm* — Greenblum & Bernstein, P.L.C.

(57) ABSTRACT

There is provided an optical signal transmitting apparatus included in an optical communication system which performs communication by transmission and reception of an optical signal indicating digital data. The optical signal transmitting apparatus includes a transmission data generating unit configured to set a data length of each frame constituting the optical signal based on a frequency tolerance of a clock signal on a transmission side and a reception side, and generate digital transmission data having multiple consecutive frames of same contents, each frame having the set data length; and a light emission driving unit configured to drive a light emitting unit to output the optical signal indicating the digital transmission data.

6 Claims, 3 Drawing Sheets

OPTICAL SIGNAL TRANSMITTING APPARATUS

FIELD OF THE INVENTION

The present invention relates to an optical signal transmitting apparatus.

BACKGROUND OF THE INVENTION

In Non-patent Documents 1 and 2, standards for visible light communication using light visible to the human eye (visible light) are described. Further, Japanese Patent No. 4325604 discloses a visible light control apparatus which performs information communication using visible light. The visible light control apparatus includes a modulation unit for modulating a subcarrier to generate a modulated signal, a visible light control unit for controlling blinking of visible light based on the modulation signal and allowing the visible light to be emitted at a predetermined emission time ratio, and a emission time ratio control unit for changing the predetermined emission time ratio.

[Non-patent Document 1] Standard of Japan Electronics and Information Technology Industries Association, [JEITA CP-1221 Visible Light Communications System] standardized by Japan Electronics and Information Technology Industries Association in March, 2007.

[Non-patent Document 2] Standard of Japan Electronics and Information Technology Industries Association, [JEITA CP-1222 Visible Light ID System] standardized by Japan Electronics and Information Technology Industries Association in June, 2007.

A transmitting apparatus of the visible light signal for performing the visible light communication as described above transmits the visible light signal that is generated based on a clock signal in the transmitting apparatus. Further, a receiving apparatus of the visible light signal receives the visible light signal based on a clock signal in the receiving apparatus. However, there may be a small deviation in frequencies of the clock signals of the transmitting apparatus and the receiving apparatus.

In case of general communication using electromagnetic signals, start-stop communication is performed by using a general-purpose communication IC such as a universal asynchronous receiver transmitter (DART) and, thus, it is possible to prevent the occurrence of a problem due to a deviation in frequency between the clock signal on the transmission side and the clock signal on the reception side does not occur. However, if the start-stop communication using the UART is applied to the visible light communication, it affects the brightness of the visible light signal. For this reason, it is inappropriate to apply the start-stop communication using the UART to the visible light communication.

Further, a frame in the visible light communication defined in the Non-patent Document 2 is composed of 542 bits, but 4 pulse position modulation (4PPM) is used as a coding scheme to modulate a subcarrier (SC). Accordingly, one frame is composed of 1084 bits physically. If one frame is composed of a large number of bits as described, the deviation in frequency between the clock signals may be accumulated, so that the visible light signal may not be decoded correctly in the receiving apparatus.

FIG. 4 shows a temporal relationship among a visible light transmission signal, the clock signal on the reception side, and the received data decoded by the receiving apparatus when the frequency of the clock signal on the reception side is lower than that of the clock signal on the transmission side.

When the frequency of the clock signal on the reception side is lower than that of the clock signal on the transmission side, the visible light transmission signal transmitted according to the clock signal on the transmission side is decoded by the receiving apparatus according to the clock signal on the reception side. However, as shown in FIG. 4, a part of the data of the visible light transmission signal may be omitted (not received) due to the deviation in frequency between the clock signals.

Here, if frequency tolerance of the clock signal on the transmission side and the reception side is ±0.5%, a difference of maximum 1% is generated in the timings of the clock signals on the transmission side and the reception side. In this case, one bit of the 100 bits becomes lost or redundant due to the deviation in frequency between the clock signals. That is, if 100 bits are received as one frame, the reception side contains an error of up to one bit in one frame.

SUMMARY OF THE INVENTION

In view of the above, the present invention provides an optical signal transmitting apparatus capable of accurately decoding an optical signal at the reception side even if there is a deviation in frequency between a clock signal on the transmission side and a clock signal on the reception side.

In accordance with an embodiment of the present invention, there is provided an optical signal transmitting apparatus included in an optical communication system which performs communication by transmission and reception of an optical signal indicating digital data, the optical signal transmitting apparatus including: a transmission data generating unit configured to set a data length of each frame constituting the optical signal based on a frequency tolerance of a clock signal on a transmission side and a reception side, and generate digital transmission data having multiple consecutive frames of same contents, each frame having the set data length; and a light emission driving unit configured to drive a light emitting unit to output the optical signal indicating the digital transmission data.

Further, when the frequency tolerance is ±A/2%, the transmission data generating unit may calculate the data length of each frame from a given formula of $(1/A) \times 100/2$.

Further, when dividing data of a predetermined data length into two frames of the set data length, the transmission data generating unit may divide the data of the predetermined data length into data of the set data length from the first bit of the data of the predetermined data length, and data of the set data length from the last bit of the data of the predetermined data length.

Further, the transmission data generating unit may be configured to generate the digital transmission data including an error detection code.

Further, the optical signal may be a visible light signal.

With the optical signal transmitting apparatus in accordance with the present invention, the optical signal can be accurately decoded at the reception side even if there is a deviation in frequency between a clock signal on the transmission side and a clock signal on the reception side.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, an embodiment of the present invention will be described in detail with reference to the accompanying drawings which form a part hereof.

Figure 1:
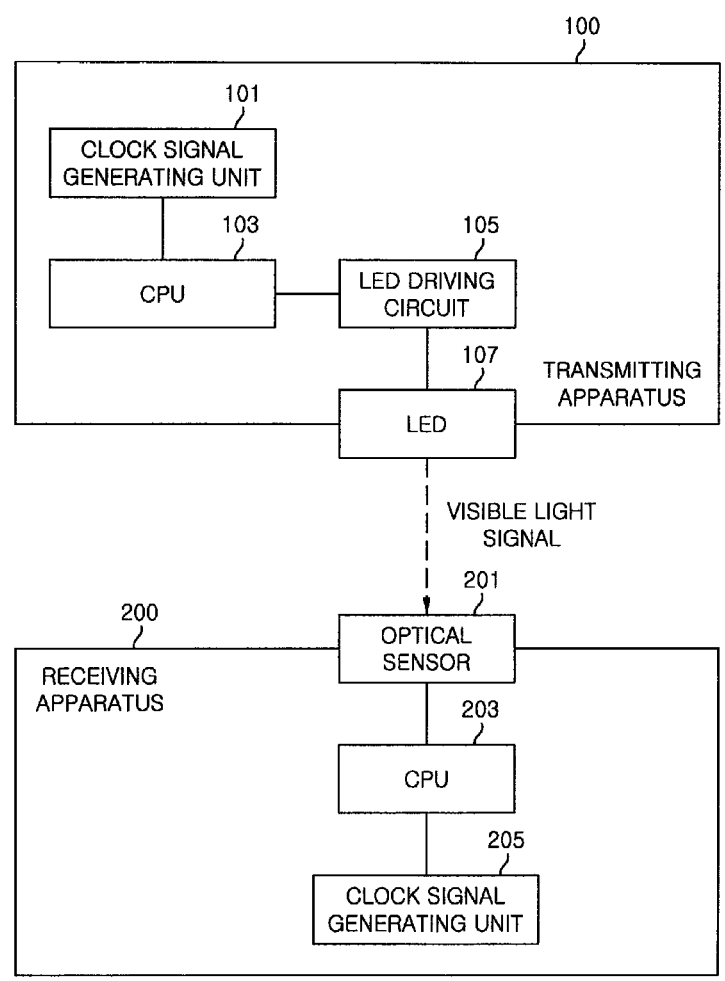
FIG. 1 is a block diagram showing a configuration of a visible light communication system in accordance with an embodiment of the present invention.

FIG. 1 is a block diagram showing a configuration of a visible light communication system in accordance with an embodiment of the present invention. As shown in FIG. 1, the visible light communication system includes a transmitting apparatus 100 which transmits a visible light signal, and a receiving apparatus 200 which receives the visible light signal transmitted from the transmitting apparatus 100. The transmitting apparatus 100 includes a clock signal generating unit 101, a CPU (transmission data generating unit) 103, an LED driving circuit (light emission driving unit) 105, and an LED (light emitting element) 107. Further, the receiving apparatus 200 includes an optical sensor 201, a CPU 203, and a clock signal generating unit 205. Further, as in the conventional case, there may be a subtle deviation in frequency between a clock signal generated by the clock signal generating unit 101 in the transmitting apparatus 100 and a clock signal generated by the clock signal generating unit 205 in the receiving apparatus 200.

In the transmitting apparatus 100, the CPU 103 generates digital transmission data according to the clock signal generated by the clock signal generating unit 101, and the LED driving circuit 105 drives the LED 107 at the timing of the clock signal based on the digital transmission data. Further, the LED 107 outputs visible light. The LED 107 is driven to output the visible light of different brightness based on the digital transmission data. The light of the LED 107 whose brightness is changed is "visible light signal."

In the receiving apparatus 200, the optical sensor 201 detects the data represented by the visible light signal from the transmitting apparatus 100, and the CPU 203 processes the data detected by the optical sensor 201 according to the clock signal generated by the clock signal generating unit 205.

In the visible light communication system shown in this embodiment, when the frequency tolerance of the clock signal on the transmission side and the reception side is $\pm A/2\%$ (A is a real number other than zero), a difference of maximum $A\%$ occurs in the timings of the clock signals on the transmission side and the reception side. Therefore, the CPU 103 of the transmitting apparatus 100 sets the bit-length of one frame in the visible light signal to be equal to or less than $(1/A)\times 100/2$ bits, and generates the digital transmission data having two or more consecutive frames of same contents without having an interval therebetween. Meanwhile, there is an interval between two or more consecutive frames of same contents and the next two or more consecutive frames of same contents.

For example, if the frequency tolerance of the clock signal on the transmission side and the reception side is $\pm 0.5\%$, a difference of up to 1% may occur in the timings of the clock signals on the transmission side and the reception side. In this case, the CPU 103 of the transmitting apparatus 100 sets the bit-length of one frame in the visible light signal to be equal to or less than 50 ($=(1/1)\times 100/2$) bits, and generates the digital transmission data containing two or more consecutive frames of same contents without having an interval therebetween. Since a difference of up to 1% may occur in the timings of the clock signals, if the bit-length of one frame is set to be 100 bits, an error of up to one bit in one frame can be included on the reception side. Further, the error of one bit is included in either the first half or the second half of the frame of 100 bits.

Figure 2:
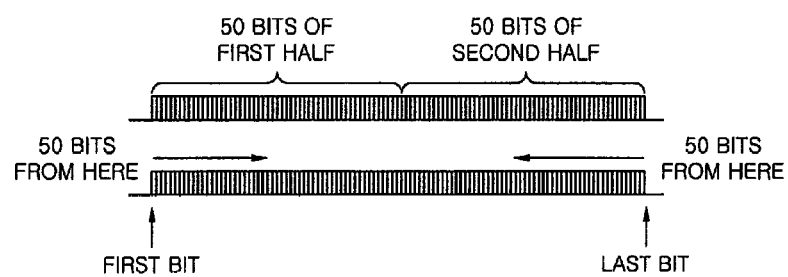
FIG. 2 shows how to divide digital data of 100 bits into a frame of 50 bits data of the first half and a frame of 50 bits data of the second half in the embodiment of the present invention.

In the present embodiment, the CPU 103 sets the bit-length of one frame to be 50 bits, and divides 100 bits digital data into a frame of 50 bits data of the first half and a frame of 50 bits data of the second half. Further, as shown in FIG. 2, 50 bits of the first half are 50 bits from the first bit, and 50 bits of the second half are 50 bits from the last bit. Further, the CPU 103 generates the digital transmission data having two consecutive frames of same contents, each frame having data of 50 bits, without having an interval therebetween. Also, multiple consecutive frames of same contents, each frame having data of 50 bits, may be transmitted without having an interval therebetween.

Figure 3:
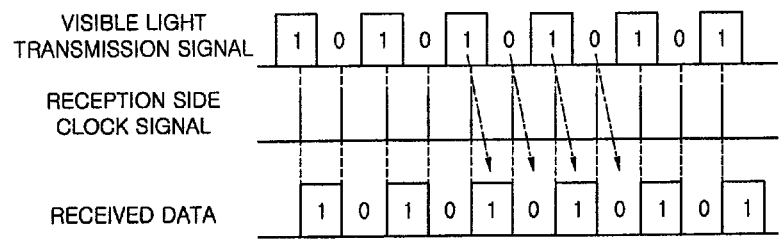
FIG. 3 is a diagram showing a temporal relationship between a visible light transmission signal of a frame that does not contain an error, a clock signal on a reception side, and a received data decoded by a receiving apparatus in the embodiment of the present invention.
Figure 4:
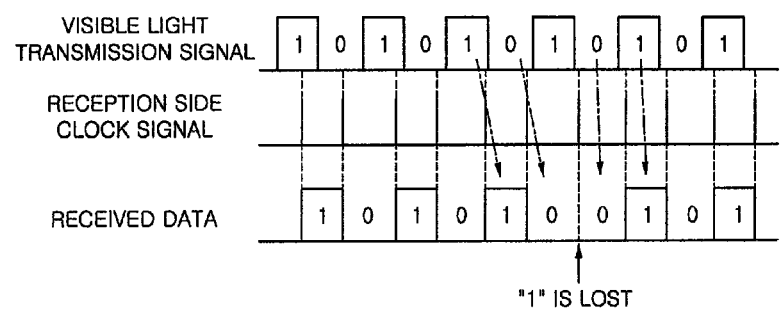
FIG. 4 is a diagram showing a temporal relationship between a visible light transmission signal, a clock signal on a reception side, and a received data decoded by a receiving apparatus when a frequency of the clock signal on the reception side is lower than that of a clock signal on a transmission side in a conventional example.

As shown in FIG. 3, the receiving apparatus 200, which receives the digital transmission data, can process the data of a frame that does not include an error among the data of 100 bits including two consecutive frames of same contents when processing the data detected by the optical sensor 201. Therefore, even if there is a deviation in frequency between the clock signals on the transmission side and the reception side, it is possible to accurately decode the visible light signal.

Further, when generating the digital transmission data, the CPU 103 may include error check codes (error detection codes) in the digital transmission data. In addition, although a system that performs communication using visible light has been described as an example in this embodiment, it is also applicable to systems that perform communication using light (e.g., infrared) other than visible light.

While the invention has been shown and described with respect to the embodiments, it will be understood by those skilled in the art that various changes and modification may be made without departing from the scope of the invention as defined in the following claims.

What is claimed is:

1. An optical signal transmitting apparatus included in an optical communication system which performs communication by transmission and reception of an optical signal indicating digital data, the optical signal transmitting apparatus comprising:

a transmission data generator configured to set a data length of each frame constituting the optical signal based on a frequency tolerance of a clock signal on a transmission side and a reception side, and generate digital transmission data having multiple consecutive frames, each frame containing identical data and having the set data length; and a light emission driver configured to drive a light emitter to output the optical signal indicating the digital transmission data, wherein, when the frequency tolerance is ±A/2%, the transmission data generator calculates the data length of each frame from a given formula of (1/A)×100/2.

2. The optical signal transmitting apparatus of claim 1, wherein when dividing data of a predetermined data length into two frames of the set data length, the transmission data generator divides the data of the predetermined data length into data of the set data length from the first bit of the data of the predetermined data length, and data of the set data length from the last bit of the data of the predetermined data length.

3. The optical signal transmitting apparatus of claim 2, wherein the transmission data generator is configured to generate the digital transmission data including an error detection code.

4. The optical signal transmitting apparatus of claim 2, wherein the optical signal is a visible light signal.

5. The optical signal transmitting apparatus of claim 1, wherein the transmission data generator is configured to generate the digital transmission data including an error detection code.

6. The optical signal transmitting apparatus of claim 1, wherein the optical signal is a visible light signal.

\* \* \* \* \*